(12) United States Patent
Cheng et al.

(10) Patent No.: US 11,514,444 B2
(45) Date of Patent: Nov. 29, 2022

(54) LEVERAGING BLOCKCHAIN BASED MACHINE LEARNING MODELING FOR EXPENSE CATEGORIZATION

(71) Applicant: Capital One Services, LLC, McLean, VA (US)

(72) Inventors: Lin Ni Lisa Cheng, New York, NY (US); John Fields, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/087,895

(22) Filed: Nov. 3, 2020

(65) Prior Publication Data

US 2022/0138731 A1    May 5, 2022

(51) Int. Cl.
*G06Q 20/38*        (2012.01)
*G06F 16/23*        (2019.01)
(Continued)

(52) U.S. Cl.
CPC ....... *G06Q 20/389* (2013.01); *G06F 16/2379* (2019.01); *G06F 16/285* (2019.01);
(Continued)

(58) Field of Classification Search
CPC ......... G06Q 30/0205; G06Q 20/38215; G06Q 10/087; G06Q 40/123; G06Q 20/389;
(Continued)

(56) References Cited

U.S. PATENT DOCUMENTS 9,471,887 B2    10/2016  Shin et al.
2005/0278221 A1  12/2005  Hahn-Carlson et al.
(Continued)

FOREIGN PATENT DOCUMENTS

| CA | 2817248 A1 | 8/2012 |
| WO | 2017060850 A1 | 4/2017 |
| WO | 2018/064645 A1 | 4/2018 |

OTHER PUBLICATIONS

Brace Yourself for AI and Blockchain; Accounting Today; Jan. 8, 2018 (Year: 2019).*
(Continued)

*Primary Examiner* — Deirdre D Hatcher
(74) *Attorney, Agent, or Firm* — Banner & Witcoff, Ltd.

(57) ABSTRACT

Systems and methods disclosed herein provide automatic expense categorization of transactions or expenditures based on a machine learning (ML) model trained using anonymized transactional data for expenditures that are stored in a public blockchain. The anonymized transactional data for the expenditure and the expense category, may be distributed throughout the blockchain network and recorded in the blockchain. In some implementations, an expenditure may be submitted to the blockchain network for expense categorization. The transactional data for the expenditure may be anonymized to remove confidential and personal identifying information (PII) before it is distributed throughout the
(Continued)

blockchain network. Each participating node of the blockchain network may utilize the ML model to identify an expense category for the expenditure. The participating nodes may provide a consensus mechanism in order to arrive at a shared understanding of how to categorize the expenditure.

18 Claims, 4 Drawing Sheets

(51) Int. Cl.

| | | |
|---|---|---|
| *G06N 20/00* | (2019.01) | |
| *G06Q 10/08* | (2012.01) | |
| *G06F 21/64* | (2013.01) | |
| *G06Q 30/02* | (2012.01) | |
| *G06Q 40/00* | (2012.01) | |
| *G06F 16/28* | (2019.01) | |
| *G06F 21/62* | (2013.01) | |

(52) U.S. Cl.
CPC .......... *G06F 21/6254* (2013.01); *G06F 21/64* (2013.01); *G06N 20/00* (2019.01); *G06Q 10/087* (2013.01); *G06Q 20/38215* (2013.01); *G06Q 30/0205* (2013.01); *G06Q 40/123* (2013.12)

(58) Field of Classification Search
CPC .... G06F 21/64; G06F 21/6254; G06F 16/285; G06F 16/2379; G06N 20/00
See application file for complete search history.

(56) References Cited

U.S. PATENT DOCUMENTS

| | | | |
|---|---|---|---|
| 2009/0254476 A1* | 10/2009 | Sharma | ................. G06Q 20/40 705/39 |
| 2015/0227890 A1 | 8/2015 | Bednarek et al. | |
| 2016/0078561 A1 | 3/2016 | Farrell et al. | |
| 2016/0125317 A1* | 5/2016 | Benjamin | .............. G06Q 30/02 706/12 |
| 2018/0285479 A1* | 10/2018 | Mackay | ................ G06F 21/552 |
| 2019/0332586 A1* | 10/2019 | Wang | .................... G06Q 30/06 |
| 2020/0334379 A1* | 10/2020 | DeRosa-Grund | ..... H04L 9/3239 |

OTHER PUBLICATIONS

How Technology Behind Bitcoin Could Transform Accounting As We Know It; Brain Station; Jan. 22, 2015 (Year: 2015).*
Understanding blockchain and its impact on accounting; Sage Advice US; Feb. 11, 2020 (Year: 2020).*
Jan. 21, 2022—(WO) International Search Report & Written Opinion—App. No. PCT/US2021/057774.

* cited by examiner

LEVERAGING BLOCKCHAIN BASED MACHINE LEARNING MODELING FOR EXPENSE CATEGORIZATION

FIELD OF USE

Aspects described herein generally relate to expense categorization communication, and hardware and software related thereto. More specifically, one or more aspects describe herein improve expense categorization of transactions by leveraging a machine learning model trained using anonymized transactional data stored in a public blockchain.

BACKGROUND

Business expenditures may be categorized using, for example, an accountant or accounting software. An expenditure may be categorized differently based on various criteria. As an example, a law firm paying for another law firm's services may be categorized differently than an import/exporter paying for a law firm's services. As another example, a marketing company's expenditures related to marketing services are likely to be normal operating costs rather than advertising expenses.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

According to one aspect, the disclosure relates to a computer-implemented method that includes training, based on transactional data stored in a blockchain, a machine learning model to identify an expense category associated with a transaction. The method includes receiving a first transaction comprising a first expense category associated with the first transaction. The method also includes determining a second expense category for the first transaction. The second expense category is determined based on at least one of: a merchant associated with the first transaction, an amount associated with the first transaction, a product identification associated with the first transaction, or a service identification associated with the first transaction, and by: selecting the second expense category for the first transaction based on a consensus of a plurality of participating nodes of the blockchain. The method includes determining whether the first expense matches the second expense category, categorizing, based on a determination that the first expense category matches the second expense category, the first transaction. The method includes, based on the categorizing of the first transaction, storing transactional data for the first transaction in the blockchain. The transactional data for the first transaction comprises an indication of an expense category based on the determination that the first expense category matches the second expense category.

According to another aspect, the disclosure relates to an apparatus that includes one or more processors, and a memory storing computer-readable instructions. The computer-readable instructions, when executed by the one or more processors, cause the apparatus to train, based on transactional data stored in a blockchain, a machine learning model to identify an expense category associated with a transaction, receive a first transaction comprising a first categorization associated with the first transaction, determine, using the machine learning model, a second categorization for the first transaction. The machine learning model is trained to determine the second categorization is based on at least one of: a merchant associated with the first transaction, an amount associated with the first transaction, a product identification associated with the first transaction, or a service identification associated with the first transaction. The computer-readable instructions, when executed by the one or more processors, cause the apparatus to also determine whether the first categorization matches the second categorization, categorize, based on a determination that the first categorization matches the second categorization, the first transaction; and based on the categorizing of the first transaction, store transactional data for the first transaction in the blockchain. The transactional data for the first transaction comprises an indication of an expense category based on the determination that the first categorization matches the second categorization.

According to another aspect, the disclosure relates to non-transitory machine-readable medium storing instructions that, when executed by one or more processors, cause the one or more processors to perform steps comprising training, based on transactional data stored in a blockchain, a machine learning model to identify a category associated with a transaction, and receiving a first transaction comprising a first categorization associated with the first transaction, determining, using the machine learning model, a second categorization for the first transaction. The second categorization is based on at least one of: a merchant associated with the first transaction, an amount associated with the first transaction, a product identification associated with the first transaction and comprising a stock-identification code (SKU), a service identification associated with the first transaction, a geographic location, or a tax code. The steps include determining whether the first categorization matches the second categorization, categorizing, based on a determination that the first categorization matches the second categorization, the first transaction; and based on the categorizing of the first transaction: anonymizing the first transaction by removing personally identifying information; and based on the categorizing of the first transaction, storing transactional data for the first transaction in the blockchain. The transactional data for the first transaction comprises an indication of an expense category based on the determination that the first expense category matches the second expense category.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
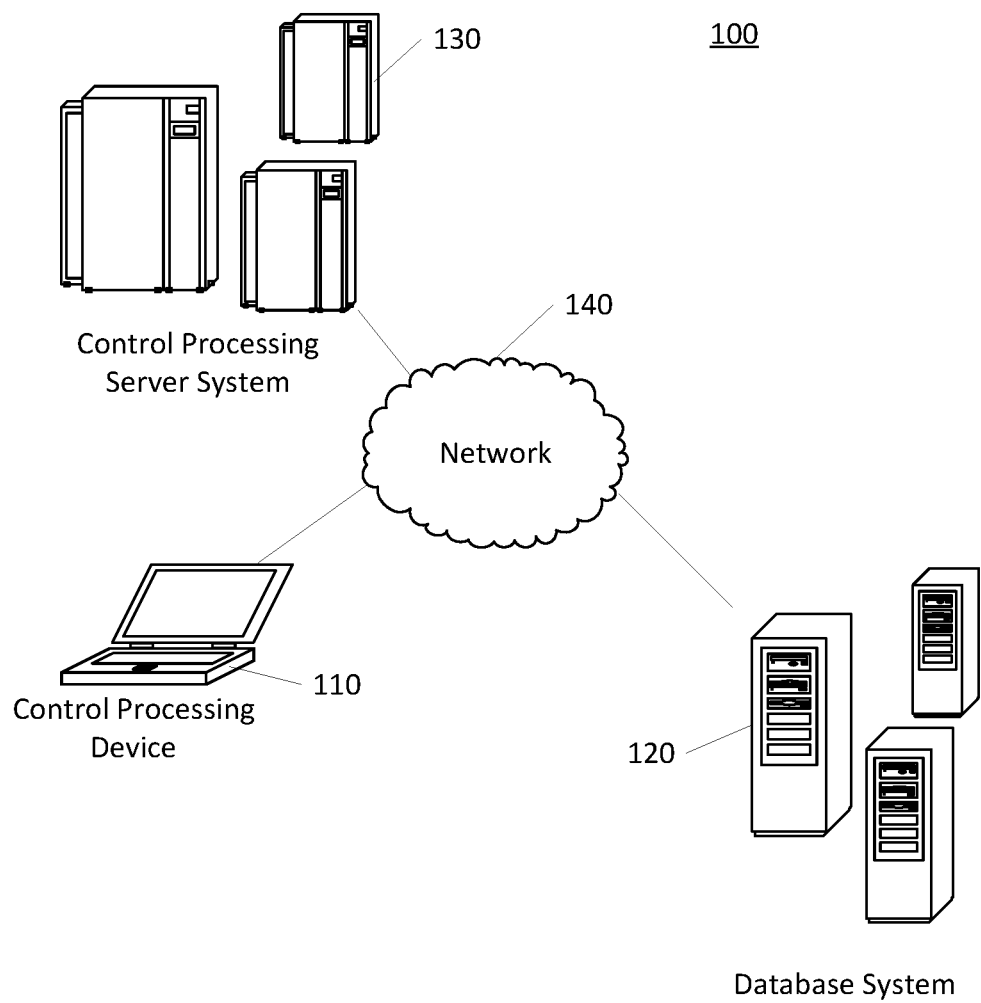
FIG. 1 shows an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Existing techniques for categorizing business expenses utilize transitional databases or data centers along with rule-based processing. These techniques do not facilitate semi-open and anonymous data sharing between businesses and service providers. Moreover, rules-based processing systems may not be accurate since they lack the flexibility to adapt quickly to changing trends based on updates to relevant parameters. Further, the rules are defined by human involvement, making these techniques predictable and easy to penetrate. Additionally, existing techniques rely on categorization provided by a financial institution or accounting systems or software which may not be able to accurately identify the expense category for an expenditure. For example, accounting software utilized by small businesses often require users to have an account in order to provide a correct expense category. While financial institutions and accounting software may accurately categorize some types of expenses, it may be challenging to categorize transactions at larger stores and chains. For example, a $100 transaction at a restaurant may reliably be categorized as a food expense. However, a $100 transaction at a large department store may be for clothing, or a service, such as a haircut. Additionally, categorizing the expenditures for small businesses may also be challenging since there are so many of them and it may not always be easy to determine what type of business it is.

Systems and methods disclosed herein provide automatic expense categorization of transactions or expenditures based on a machine learning (ML) model trained using anonymized transactional data for expenditures that are stored in a public blockchain. A machine learning (ML) model may be trained to evaluate an expenditure and identify an expense category for the expenditure. The training data for the ML model may be received from one or more sources. For example, one of the sources of training data may be transactional information stored or recorded in a public blockchain. Other sources may include accounting systems, accountants, financial institution databases, etc. Utilizing the ML model, an expenditure may be categorized as a legal expense, client development expense, marketing expense, food expense, travel expense, entertainment expense, etc.

As discussed above, one of the sources of training data may be transactional information stored or recorded in a public blockchain. Entities, such as businesses or individuals, may choose to record their expenditures in a public blockchain by submitting information about their expenditures to a blockchain network. A submitted expense or expenditure may be anonymized by removing confidential and personally identifiable information (PII) before it is distributed throughout the blockchain network. The anonymized data is subsequently recorded in the blockchain. As an example, Company A may purchase a product from a merchant. Company A may submit transactional data about the purchase to the blockchain network. The submitted data may include an initial expense category for the purchase. The initial expense category may have been determined by Company A's accounting software. The transactional data associated with the purchase may include an identification of the merchant, the SKU, and/or the price. The submitted data may be anonymized by removing information, such as an identification of Company A, and other potentially confidential information. The anonymized data may be distributed to the participating nodes of the blockchain network and subsequently recorded in a blockchain stored by the blockchain network. The transactional data recorded in the blockchain may serve as the training data for the ML model.

A business may submit an expenditure for expense categorization. An expense category for the expenditure may be identified using the ML model. Expert scoring and feedback may be added to increase the level of confidence of the categorization. After an expense category is identified, the transactional data for the expenditure may be anonymized to remove confidential and personal identifying information (PII). The anonymized transactional data for the expenditure and the expense category, may be distributed throughout the blockchain network and recorded in the blockchain.

In some implementations, an expenditure may be submitted to the blockchain network for expense categorization. The transactional data for the expenditure may be anonymized to remove confidential and personal identifying information (PII) before it is distributed throughout the blockchain network. Each participating node of the blockchain network may utilize the ML model to identify an expense category for the expenditure. The participating nodes may provide a consensus mechanism in order to arrive at a shared understanding of how to categorize the expenditure.

Systems and methods disclosed herein may provide business profile specific expense categorization through machine learning based on an entity's (e.g. an individual, a merchant, an organization, a company or a business) expenditures. The confirmed transaction data and/or related smart contracts may be distributed or recorded into the blockchain network for additional security and privacy protection. Smart contracts may be developed on top of the blockchain to execute an action for some desired outcome, either on behalf of one, more than one or all companies. For example, a categorization of an expense may be of interest to the vendor/retailer. Although this information is anonymous, in aggregate this information could be informational. With multiple inputs via, for example, a financial institution, Enterprise Resource Planning (ERP), an accounting system, regulations (i.e. legal or tax regulations), and/or user adjustments, the process may be streamlined from multiple sources for multiple verifications in order to improve the accuracy of recording the expenditure for reporting, taxation, and other legal purposes. The decentralized network distribution may enable private node networks among the users, verification and trust-proof onboarded partners, from service providers, such as, cross-border financial institutions' networks, ERP, accountants, etc., for anonymous sharing via a double-blind confirmation process and training of an ML model. The training of the ML model may enhance the alignment of the automatic process based on the business profile and past transaction activity. The blockchain node distribution may provide privacy protections and additional security measurements in place to prevent manipulation of stored records or data. Anonymizing data prior to storing it in the blockchain enables users and regulators to drill down into the transactional data beyond the aggregated level and gain meaningful insight into the data. Additional ML models may be implemented for converting stored transactional data into synthetic data prior to extraction of the data from the blockchain.

Systems and methods disclosed herein may improve the speed and accuracy with which computers recognize and categorize business expenses, especially eclectic expenses, such as local shops and non-chain retailers (e.g., boutique retailers, local restaurants, etc.). Systems and methods disclosed herein may enable businesses to categorize expenditures with a better accuracy than that of a human, such as an accountant. Thus, implementations improve the speed and accuracy with which computers categorize business expenses. The ML based expense categorizing may also include mapping to different tax or legal codes, thus, enabling businesses to streamline their tax processes. Expense categorization based on considering various tax codes may be helpful for businesses operating across different countries.

Additionally, implementations enable a business to safely and securely automate accounting and legal processes via crowd sourced knowledge from other businesses without exposing its own identity, trade secrets, and/or other confidential information. The confidence level of the process may be measured and improved via a feedback loop. Implementations also provide standardization that improves the consistency of expense categorization among businesses having the same profile (industry).

FIG. 1 shows a system 100. The system 100 may include at least one client device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client device 110 may access server applications and/or resources using one or more client applications (not shown) as described herein. Client device 110 may be a mobile device, such as a laptop, smart phone, or tablet, or computing devices, such as a desktop computer or a server. Alternatively, client device 110 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 120 may be configured to maintain, store, retrieve, and update information for server system 130. Further, database system may provide server system 130 with information periodically or upon request. In this regard, database system 120 may be a distributed database capable of storing, maintaining, and updating large volumes of data across clusters of nodes. Database system 120 may provide a variety of databases including, but not limited to, relational databases, hierarchical databases, distributed databases, in-memory databases, flat file databases, XML databases, NoSQL databases, graph databases, and/or a combination thereof.

Server system 130 may be configured with a server application (not shown) that is capable of interfacing with client application and database system 120 as described herein. In this regard, server system 130 may be a stand-alone server, a corporate server, or a server located in a server farm or cloud-computer environment. According to some examples, server system 130 may be a virtual server hosted on hardware capable of supporting a plurality of virtual servers.

Network 140 may include any type of network. For example, network 140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
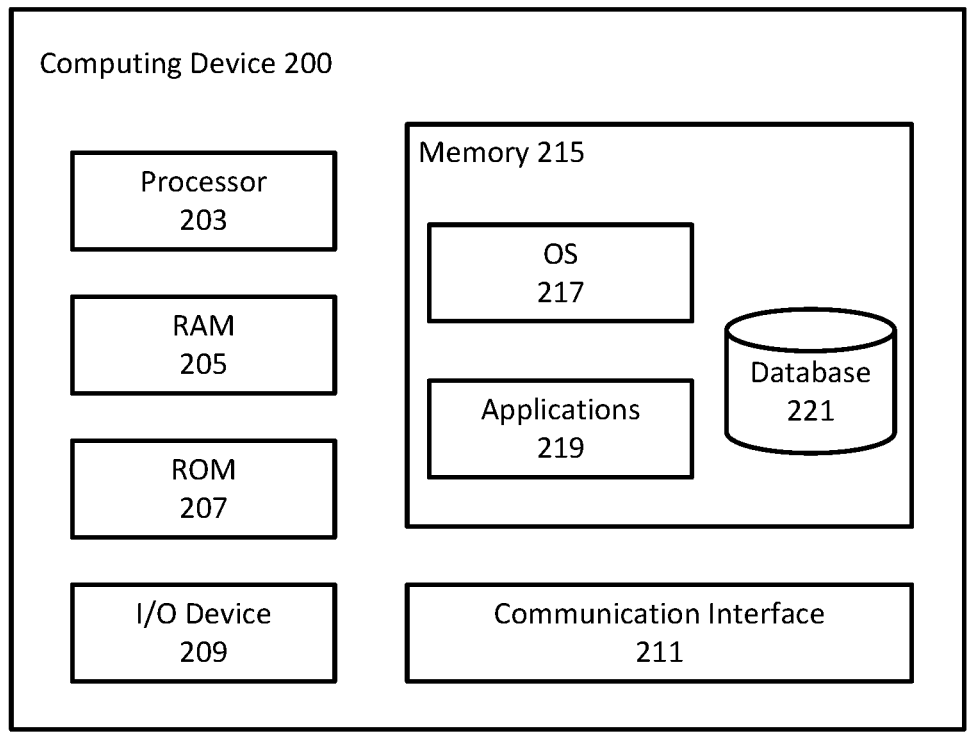
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device. Additionally or alternatively, computing device 200 may represent, be incorporated in, and/or include various devices such as a computing device associated with a node in a blockchain network.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
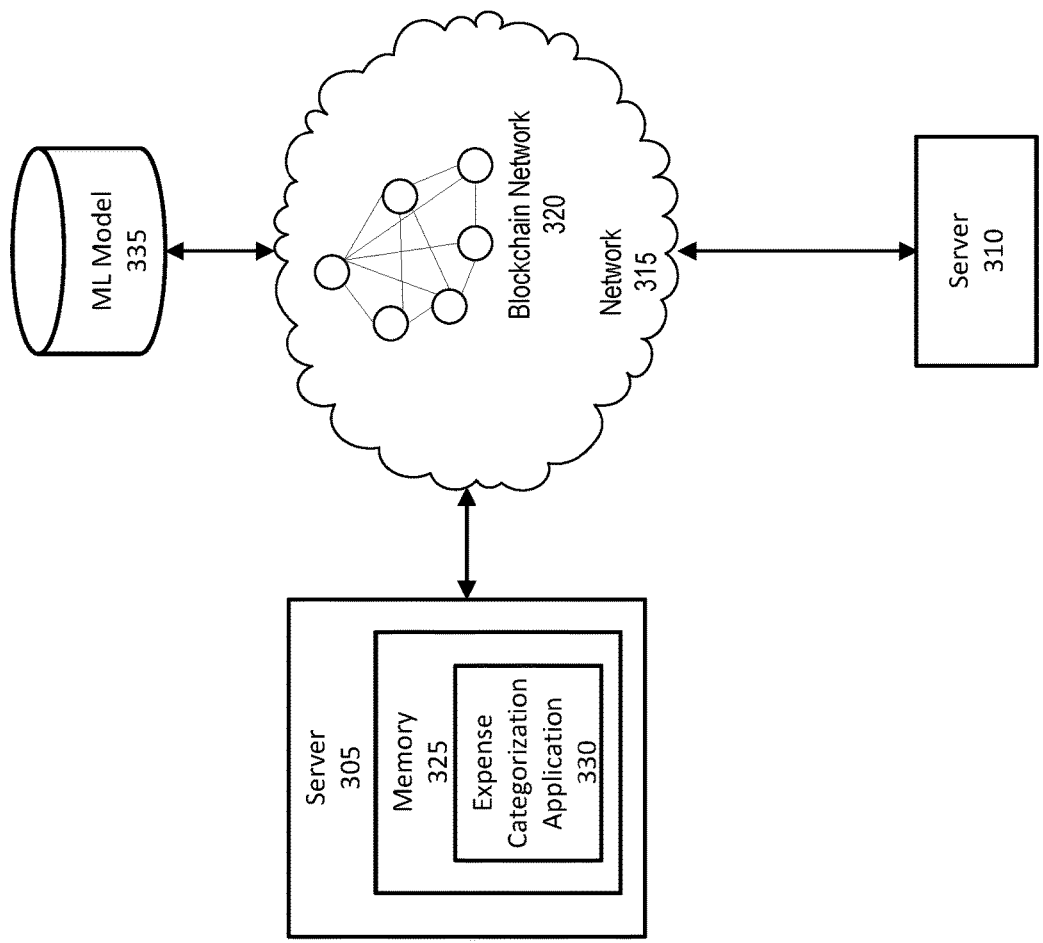
FIG. 3 shows an example system for leveraging blockchain based machine learning modeling for expense categorization.

FIG. 3 shows an example system 300 for leveraging blockchain based machine learning modeling for expense categorization. The system 300 comprises a first server 305, a second server 310, and a database, such as the ML model 335, interconnected via a network 315. The network 315 may include a public distributed peer-to-peer (P2P) network or blockchain network 320. A memory 325 of the server 305 may include one or more applications, such as, an expense categorization application 330.

The expense categorization application 330 may train the machine learning (ML) model 335 to identify an expense category for a given transaction. The ML model 335 may be trained based on evaluating transactional data received from multiple sources. For example, the ML model 335 may be trained based on transactional data recorded and/or stored in the blockchain of the blockchain network 320. The transactional data may include information about expenditures stored and/or recorded in the blockchain of the blockchain network 320. The expenditures may be submitted by various sources (e.g. financial institutions, individuals, companies, businesses, accountants, accounting systems, etc.). Legal and tax code information may also be provided as inputs to the ML model 335. The ML model 335 may utilize the legal and tax code information to provide different categorizations for the same expenditure due to different tax laws, regulations, and/or geographic locations. For example, the same expenditure may be categorized differently under different countries' or states' tax codes.

The ML model 335 may be trained to identify an expense category for a transaction. The ML model 335 may be trained using data and/or information stored in blockchain 320. For example, training the ML model 335 may comprise determining expense categories for transactions recorded in blockchain 320, for example, by analyzing transactional data. The transactional data may comprise information relevant for determining an expense category for the transaction, such as, a merchant associated with the transaction, a price or amount associated with the transaction, an identification of an item or product, for example, an SKU code, or an identification of a service associated with the transaction. As more and more transactions are recorded in the blockchain and subsequently included in the training set, the accuracy of the ML model's expense categorization increases.

As discussed above, an entity may submit an expenditure to be recorded in the blockchain. For example, the entity may send information about its expenditure from the second server 310 to the first server 305. The expense categorization application 330 may anonymize the transactional data associated with the expenditure to remove personal identifying information (PII), trade secrets, and/or other confidential information. The expense categorization application 330 may then submit the anonymized transactional data to the blockchain network 320. The distributed anonymized transactional data is recorded in the blockchain. The anonymized transactional data recorded in the blockchain may be utilized as a training set for the ML model 335.

A company may submit, via the second server 310, information about an expenditure to the first server 305 in order to receive an expense categorization for the expenditure. The information about the expenditure may include an initial expense categorization. The initial expense categorization may be determined by, for example, the company's accounting software. The expense categorization application 330 may anonymize certain information related to the expenditure. The expense categorization application 330 may determine, using the ML model 335, a second expense categorization for the transaction. As discussed above, the ML model 335 may be trained to determine the second expense categorization based on information associated with the expenditure, such as, a merchant, an amount, a product identification, and/or a service identification. The product identification may include a stock-identification code (SKU), or UPC. Other factors or criteria related to the expenditure, such as a type of the business submitting the expenditure, may also be considered leading to a categorization with a higher level of confidence. For example, an expenditure may be categorized differently depending on whether the expenditure was associated with a plumbing company or a defense contractor. Profiling may be utilized and includes matching an entity's transactions with other entities' transactions. For example, the ML model 335 may indicate that the expenditure submitted by company A has been identified by other companies with the same profile as company A to be Category X.

The expense categorization may also include mapping to different tax or legal codes. An expenditure may need to be categorized differently in order to receive tax credit according to a country's tax laws. For example, under one country's tax law, only 50% of an expenditure related to entertainment may be claimed for tax credit, while in another other country, 100% of that expenditure may be claimed for tax credit. Expense categorization based on tax code considerations may be helpful for businesses operating across multiple countries.

The expense categorization application 330 may determine whether the initial categorization matches the second expense categorization. If the initial categorization matches the second categorization, then the expense categorization application 330 may output the initial categorization. If the initial categorization does not match the second expense category, the expense categorization application 330 may notify (e.g., alert) an administrator. Additionally or alternatively, the expense categorization application 330 may classify the expenditure (e.g., transaction) using the second expense categorization and output. In some implementations, the expense categorization application 330 may, based on determining the expense categorizing of the expenditure, record the relevant transactional data for the expenditure and the expense category in the blockchain. The recorded transaction data and expense category for the expenditure may be provided back to the ML model 335 via a feedback loop.

Participating nodes in the blockchain network 320 may provide a consensus mechanism in order to arrive at a shared understanding of how to categorize an expense. Referring back to the example above, a company may submit, via the second server 310, information about an expenditure to the first server 305 in order to receive an expense categorization for the expenditure. The information about the expenditure may include an initial expense categorization. The expense categorization application 330 may anonymize information related to the expenditure, and then submit the anonymized expenditure to the blockchain network 320. Each participating node of the blockchain network 320 may categorize the submitted expenditure based on utilizing the ML model 335. For example, a first participating node of the blockchain network 320 may categorize the expenditure and come up with an expense category. If a second participating node in the blockchain network 320 categorizes the expenditure and comes up with the same expense category as that of the first participating node, then the categorization of the expenditure is confirmed by the two participating nodes. If a majority of the participating nodes come up with the same expense category, then consensus is reached. If a majority of participating nodes do not come up with the same expense category, then consensus is not reached, and additional inputs may be required. These inputs may be taken from a professional accountant or accounting software and may result in a higher score and thus, a recommended expense categorization. The recommended expense categorization may remain as the default reference point in the ML model. The user may still be able to record the information in the blockchain. However, the recorded information may include a notation of the recommendation. Additionally, participating nodes in the blockchain network 320 would not know who provided the expense categorization or who requested the expense categorization. Once the expenditure is categorized based on a consensus mechanism, the expense categorization application 330 may receive confirmed expense categorization data for the expenditure. After categorization is confirmed, the transactional data associated with the expenditure may be recorded in the blockchain.

In some cases, if there is insufficient training data or the transactional data does not include suitable information for the ML model 335, the expense categorization may vary and it may not be possible to provide a categorization with a high level of confidence. In other words, the transactions related to a specific type of expenditure may not be readily reconcilable to a specific expense category. In such cases, another participating node in the blockchain network may attempt to provide more insight into the transaction and suggest a category based on other criteria, for example, the type of the business. This participating node may be the manufacturer or retailer that would be interested in augmenting the system and may provide information to help fill in the gaps, even though this node itself is not categorizing the expense. In this scenario, the blockchain network 320 would see only one participating node providing this information and that consensus has not yet been reached.

Figure 4:
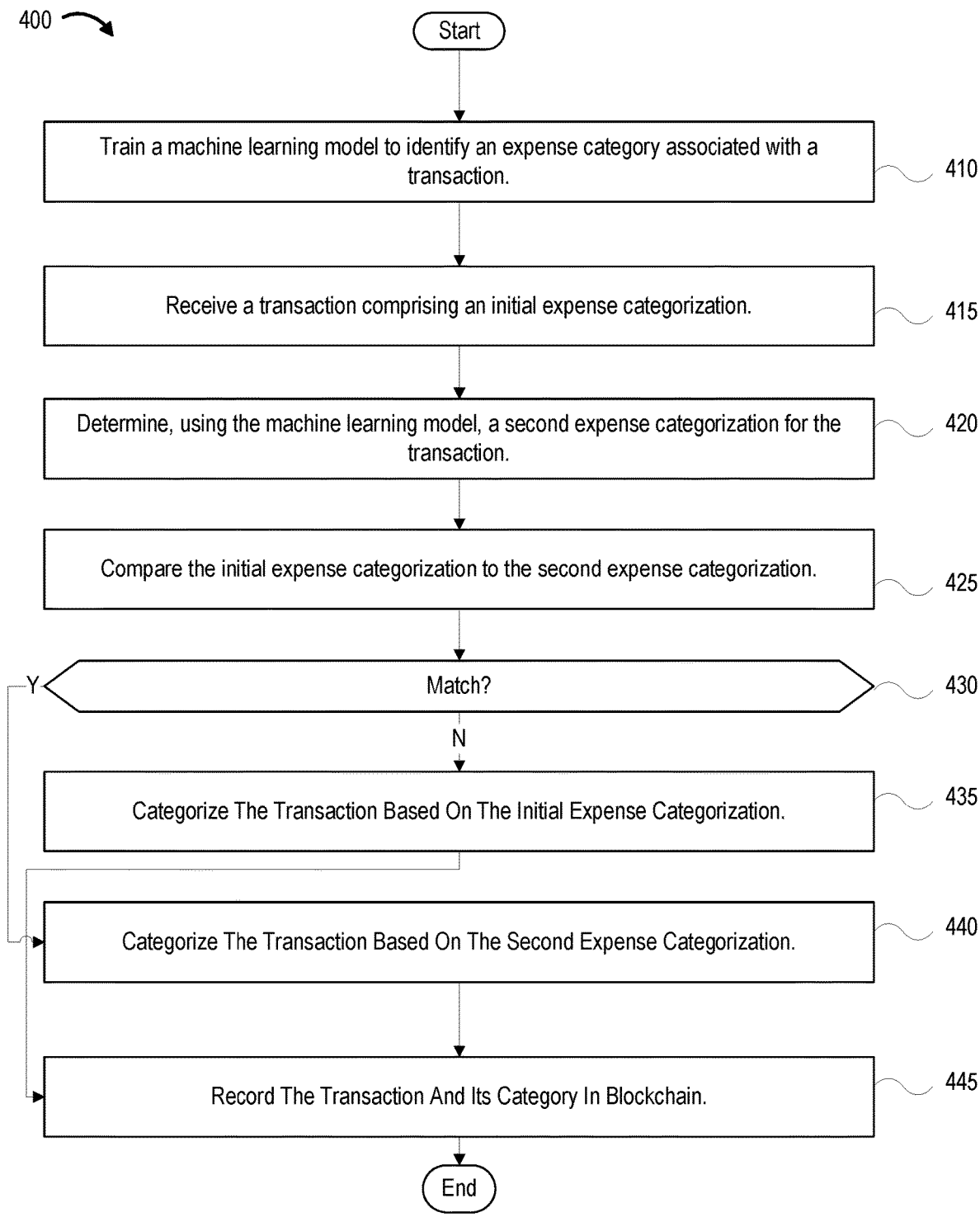
FIG. 4 shows a flow diagram of an example method for leveraging blockchain based machine learning modeling for expense categorization.

FIG. 4 is a flow diagram of an example method 400 for leveraging blockchain based machine learning modeling for expense categorization performed by a computing device (e.g. the expense categorization application 330 executing on the server 305, as shown in FIG. 3). Alternatively or additionally, some or all of the steps of the method 400 may be performed by one or more other computing devices. The steps of the method 400 may be modified, omitted, and/or performed in other orders, and/or other steps added.

At step 410, a computing device (e.g. the expense categorization application 330 executing on the server 305) may train a machine learning (ML) model, such as ML model 335, to identify an expense category for a given transaction. The ML model may be trained based on evaluating transactional data received from multiple sources. For example, the ML model may be trained based on transactional data recorded and/or stored in a blockchain, such as blockchain network 320. The expenditures may be submitted by various sources (e.g. financial institutions, individuals, companies, businesses, accountant, accounting systems, etc.). Legal and tax code information may also be provided as inputs to the ML model. The ML model may utilize the legal and tax code information to provide different categorization of the same expenditure due to different tax laws, regulations, or geographic locations. For example, the same expenditure may be categorized differently under different countries' tax codes.

As discussed above, an entity may submit an expenditure to be recorded in the blockchain. For example, the entity may send information about its expenditure from the second server 310 to the first server 305. The expense categorization application 330 may anonymize the transactional data associated with the expenditure to remove personal identifying information (PII), trade secrets, and/or other confidential information. The expense categorization application 330 may then submit the anonymized transactional data to the blockchain network 320. The distributed anonymized transactional data is recorded in the blockchain. The anonymized transactional data recorded in the blockchain may be utilized as a training set for the ML model 335.

The ML model 335 may be trained to identify an expense category for a transaction. Training the ML model 335 may include determining expense categories for transactions recorded in the blockchain of the blockchain network 320. The ML model 335 may be trained using supervised learning, unsupervised learning, back propagation, transfer learning, stochastic gradient descent, learning rate decay, dropout, max pooling, batch normalization, long short-term memory, skip-gram, or any equivalent deep learning technique. The transactional data associated with a transaction recorded in the blockchain may include information relevant for determining an expense category for the transaction, such as, a merchant associated with the transaction, a price or amount associated with the transaction, an identification of an item or product, for example, an SKU code or UPC, or an identification of a service associated with the transaction. As more and more transactions are recorded in the blockchain and subsequently included in the training set, the accuracy of the ML model's expense categorization increases.

At step 415, a computing device (e.g. the expense categorization application 330 executing on the server 305) may receive a request for categorization of a transaction. For example, a company may submit, via the second server 310, information about an expenditure to the first server 305 in order to receive an expense categorization for the expenditure. The information about the expenditure may include an initial expense categorization. The initial expense categorization may be determined by, for example, the company's accounting software. The expense categorization application 330 may anonymize certain information related to the expenditure.

At step 420, a computing device (e.g. the expense categorization application 330 executing on the server 305) may determine, using the ML model 335, a second categorization for the transaction. The second categorization may be based on at least one of a merchant associated with the transaction, an amount associated with the transaction, a product identification associated with the transaction, and/or a service identification associated with the transaction. The product identification may include a stock-identification code (SKU) or UPC. Other factors or criteria related to the expenditure, such as a type of the business, may also be considered leading to a categorization with a higher level of confidence. For example, an expenditure may be categorized differently depending on whether the expenditure was associated with a plumbing company or a defense contractor. Profiling may be utilized and includes matching an entity's transactions with other entities' transactions. For example, the ML model 335 may indicate that the expenditure submitted by company A has been identified by other companies with the same profile as company A to be Category X.

At step 425, a computing device (e.g. the expense categorization application 330 executing on the server 305) may compare the initial categorization to the second categorization. At step 430, a computing device (e.g. the expense categorization application 330 executing on the server 305) may determine that the initial categorization does not match the second categorization and the process 400 proceeds to step 435. At step 435, a computing device (e.g. the expense categorization application 330 executing on the server 305) may categorize the transaction, based the second categorization. If the initial categorization does not match the second expense category, the expense categorization application 330 may notify (e.g., alert) an administrator. However, at step 430, if a computing device (e.g. the expense categorization application 330 executing on the server 305) determines that the initial categorization matches the second categorization, then the process 400 proceeds to step 440. At step 440, a computing device (e.g. the expense categorization application 330 executing on the server 305) may categorize the transaction, based on the initial categorization.

At step 445, a computing device (e.g. the expense categorization application 330 executing on the server 305) may, based on the categorizing of the transaction, store or record the transactional data for the transaction in the blockchain of the blockchain network 320. The transactional data for the transaction may include an indication of the expense category based on the determination that the initial expense category matches the second expense category. The determined expense category may also be sent from the first server 305 to the second server 310 and to the entity that submitted the request for the expense categorization.

The method and systems described herein provide and enable businesses to categorize expenditures with an accuracy close to what it would be using an accountant and at a significantly lower cost than using an accountant. Thus, implementations improve the speed and accuracy with which computers categorize business expenses. Additionally, mapping the business profile would provide better quality of results. With multiple inputs via, for example, a financial institution, Enterprise Resource Planning (ERP), an accounting system, regulations (i.e. legal or tax regulations), and user adjustments, the process may be streamlined from multiple sources for multiple verifications in order to improve the accuracy of recording the expenditure for reporting, taxation, and other legal purposes. The decentralized network distribution may enable private node networks among the users, verification and trust-proof onboarded partners, from service providers, such as, cross-border financial institutions' networks, ERP, accountants, etc., for anonymous sharing via a double-blind confirmation process and training of an ML model. The training of the ML model may enhance the alignment of the automatic process based on the business profile and past transaction activity. The blockchain node distribution may provide privacy protections and additional security measurements in place to prevent manipulation of stored records or data. Anonymizing data prior to storing it in the blockchain enables users and regulators to drill down into the transactional data beyond the aggregated level and gain meaningful insight. Additional ML models may be implemented for converting stored transactional data into synthetic data prior to extraction of the data from the blockchain.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
    training, based on transactional data stored in a blockchain, a machine learning model to identify an expense category associated with a transaction;
    receiving a first transaction comprising a first expense category associated with the first transaction, wherein the first expense category is determined by accounting software;
    determining, by at least one participating node of the blockchain and using the machine learning model, a second expense category for the first transaction, wherein the second expense category is determined using at least one of: a merchant associated with the first transaction, an amount associated with the first transaction, a product identification associated with the first transaction, or a service identification associated with the first transaction;
    selecting, based on a consensus of a plurality of participating nodes of the blockchain, the second expense category for the first transaction;
    determining whether the first expense category, determined by the accounting software, matches the second expense category, determined using the machine learning model;
    categorizing, based on a determination that the first expense category matches the second expense category, the first transaction;
    based on the categorizing of the first transaction:
        anonymizing the first transaction by removing personally identifiable information from transactional data associated with the first transaction; and
        storing the transactional data in the blockchain, wherein the transactional data for the first transaction comprises an indication of an expense category based on the determination that the first expense category matches the second expense category; and
    providing, to the machine learning model via a feedback loop, the indication of the expense category for the first transaction.

2. The method of claim 1, wherein the product identification comprises a stock-identification code (SKU).

3. The method of claim 1, wherein the training the machine learning model comprises:
    determining, by the at least one participating node of the blockchain, a category for a second transaction, wherein the determination is based on at least one of: a second merchant associated with the second transaction, a second amount associated with the second transaction, a product identification associated with the second transaction, or a service identification associated with the second transaction; and
    storing second transactional data for the second transaction in the blockchain, wherein the second transactional data comprises the category for the second transaction determined by the at least one participating node of the blockchain.

4. The method of claim 3, wherein determining the category for the second transaction comprises:
    selecting the category for the second transaction based on a second consensus of the plurality of participating nodes of the blockchain.

5. The method of claim 1, wherein the consensus is based on a consensus model that comprises at least one of: a proof of work consensus model, a proof of stake consensus model, or a proof of authority consensus model.

6. The method of claim 1, wherein the determining the second expense category for the first transaction is based on a geographic location.

7. The method of claim 1, wherein the determining the second expense category for the first transaction is based on a tax code.

8. The method of claim 1, further comprising:
    receiving a second transaction comprising a third expense category associated with the second transaction;
    determining, by the at least one participating node of the blockchain and using the machine learning model, a fourth expense category for the second transaction, wherein the fourth expense category is based on at least one of: a merchant associated with the second transaction, an amount associated with the second transaction, a product identification associated with the second transaction, or a service identification associated with the second transaction;
    determining whether the third expense category matches the fourth expense category; and notifying, based on a determination that the third expense category does not match the fourth expense category, an administrator.

9. The method of claim 8, further comprising:
creating, based on a determination that the third expense category does not match the fourth expense category, a new category for the second transaction, wherein the new category is based on the fourth expense category; and
categorizing, using the new category, the second transaction.

10. The method of claim 8, further comprising:
storing second transactional data for second first transaction in the blockchain, wherein the second transactional data for the second transaction comprises:
an indication of the third expense category; and
a notation of the fourth expense category.

11. An apparatus comprising:
one or more processors; and
memory storing instructions that, when executed by the one or more processors, cause the apparatus to:
train, based on transactional data stored in a blockchain, a machine learning model to identify an expense category associated with a transaction;
receive a first transaction comprising a first categorization associated with the first transaction, wherein the first categorization is determined by accounting software;
determine, using the machine learning model, a second categorization for the first transaction, wherein the machine learning model is trained to determine the second categorization based on a consensus of a plurality of participating nodes of the blockchain and based on using at least one of: a merchant associated with the first transaction, an amount associated with the first transaction, a product identification associated with the first transaction, or a service identification associated with the first transaction;
select, based on a consensus of a plurality of participating nodes of the blockchain, the second categorization, wherein the apparatus comprises at least one participating node of the plurality of participating nodes;
determine whether the first categorization, determined by the accounting software, matches the second categorization, determined using the machine learning model;
categorize, based on a determination that the first categorization matches the second categorization, the first transaction;
based on the categorizing of the first transaction:
anonymize, prior to storing the first transaction in the blockchain, the first transaction by removing personally identifiable information from transactional data associated with the first transaction; and
store the transactional data in the blockchain, wherein the transactional data for the first transaction comprises an indication of an expense category based on the determination that the first categorization matches the second categorization;
provide, to the machine learning model via a feedback loop, the indication of the expense category for the first transaction.

12. The apparatus of claim 11, wherein the product identification comprises a stock-identification code (SKU).

13. The apparatus of claim 11, wherein the training the machine learning model comprises:
determining, by one or more nodes of the plurality of participating nodes of the blockchain, a category for a second transaction, wherein the determination is based on at least one of: a second merchant associated with the second transaction, a second amount associated with the second transaction, a product identification associated with the second transaction, or a service identification associated with the second transaction; and
storing second transactional data for the second transaction in the blockchain, wherein the second transactional data comprises the category for the second transaction determined by the one or more nodes of the plurality of participating nodes of the blockchain.

14. The apparatus of claim 13, wherein the determining the category for the second transaction comprises:
selecting the category for the second transaction based on a second consensus of the plurality of participating nodes of the blockchain.

15. The apparatus of claim 11, wherein the consensus is based on a consensus model that comprises at least one of: a proof of work consensus model, a proof of stake consensus model, or a proof of authority consensus model.

16. The apparatus of claim 11, wherein the determining the second categorization for the first transaction is based on a geographic location.

17. The apparatus of claim 11, wherein the determining the second categorization for the first transaction is based on a tax code.

18. A non-transitory machine-readable medium storing instructions that, when executed by one or more processors, cause the one or more processors to perform steps comprising:
training, based on transactional data stored in a blockchain, a machine learning model to identify a category associated with a transaction;
receiving a first transaction comprising a first expense category associated with the first transaction, wherein the first expense category is determined by accounting software;
determining, using the machine learning model, a second expense category for the first transaction, wherein the second expense category is determined using at least one of: a merchant associated with the first transaction, an amount associated with the first transaction, a product identification associated with the first transaction and comprising a stock-identification code (SKU), a service identification associated with the first transaction, a geographic location, or a tax code;
selecting, based on a consensus of a plurality of participating nodes of the blockchain, the second expense category;
determining whether the first expense category, determined by the accounting software, matches the second expense category, determined by the machine learning model;
categorizing, based on a determination that the first expense category matches the second expense category, the first transaction;
based on the categorizing of the first transaction:
anonymizing the first transaction by removing personally identifying information from transaction data associated with the first transaction; and
storing the transactional data in the blockchain, wherein the transactional data for the first transaction comprises an indication of an expense category based on the determination that the first expense category matches the second expense category; and providing, to the machine learning model via a feedback loop, the indication of the expense category for the first transaction.

* * * * *